(12) United States Patent
El Sayed et al.

(10) Patent No.: US 11,390,166 B2
(45) Date of Patent: Jul. 19, 2022

(54) CONTROL SYSTEM FOR A VEHICLE

(71) Applicant: FAURECIA INTERIEUR INDUSTRIE, Nanterre (FR)

(72) Inventors: Ahamed El Sayed, Chanteloup les Vignes (FR); Edouard Da Silva, Herblay (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 17/124,488

(22) Filed: Dec. 16, 2020

(65) Prior Publication Data

US 2021/0178901 A1 Jun. 17, 2021

(30) Foreign Application Priority Data

Dec. 17, 2019 (FR) ..................................... 19 14603

(51) Int. Cl.
*B60K 37/06* (2006.01)
*G06F 3/0354* (2013.01)
*B60H 1/00* (2006.01)

(52) U.S. Cl.
CPC ............ *B60K 37/06* (2013.01); *G06F 3/0354* (2013.01); *B60H 1/0065* (2013.01); *B60H 1/00985* (2013.01); *B60K 2370/126* (2019.05); *B60K 2370/143* (2019.05)

(58) Field of Classification Search
CPC .............. B60K 37/06; B60K 2370/143; B60K 2370/126; G06F 3/0354; B60H 1/0065; B60H 1/00985
See application file for complete search history.

(56) References Cited

U.S. PATENT DOCUMENTS

| 5,819,597 A * | 10/1998 | Sato ..................... H01H 19/005 74/553 |
| 10,409,470 B2 | 9/2019 | Powell et al. |
| 10,486,533 B2 | 11/2019 | Ruemelin et al. |
| 10,705,629 B1 * | 7/2020 | Arnold ................ G06F 3/03547 |
| 2006/0017585 A1 * | 1/2006 | Lenneman ............. B60K 35/00 340/691.6 |
| 2012/0249315 A1 * | 10/2012 | Vanhelle .................. G05G 5/03 340/425.5 |

(Continued)

FOREIGN PATENT DOCUMENTS

| WO | 2018137944 A1 | 8/2018 |
| WO | 2019073541 A1 | 4/2019 |

OTHER PUBLICATIONS

French Search Report corresponding to French Application No. FR 1914603, dated Dec. 10, 2020, 2 pages.

*Primary Examiner* — Ariel A Balaoing
(74) *Attorney, Agent, or Firm* — Reising Ethington P.C.

(57) ABSTRACT

A control system that includes a tactile surface and at least a control member fixed to the tactile surface and rotatable relative to the tactile surface around a first direction which is substantially perpendicular to the tactile surface between at least two selection positions. The control member includes at least a first sensor element integral in rotation with the control element, the first sensor element being coupled to the tactile surface in all selection positions of the control element. The first sensor element forms an interrupted ring defining at least one interruption area decoupled from the tactile surface on the control element.

12 Claims, 4 Drawing Sheets

(56) References Cited

U.S. PATENT DOCUMENTS

| | | |
|---|---|---|
| 2017/0052617 A1 | 2/2017 | Okuzumi et al. |
| 2018/0074639 A1* | 3/2018 | Powell ................ G06F 3/04847 |
| 2019/0272053 A1 | 9/2019 | Ballan et al. |
| 2019/0391672 A1 | 12/2019 | Fischer et al. |
| 2021/0055806 A1* | 2/2021 | Shepelev ............... B60K 37/06 |
| 2021/0149431 A1* | 5/2021 | Park ......................... F21V 7/04 |
| 2021/0181875 A1* | 6/2021 | Lefort ................. G06F 3/03547 |
| 2021/0232260 A1* | 7/2021 | Fong ..................... H01H 25/06 |

* cited by examiner

CONTROL SYSTEM FOR A VEHICLE

This patent claims the benefit of document FR 19 14603 filed on Dec. 17, 2019, which is hereby incorporated by reference.

BACKGROUND

Field of the Invention

The present invention relates to a control system for a vehicle.

More particularly, the invention relates to a control system for a vehicle, of the type comprising:
- a tactile surface,
- at least one control member attached to the tactile surface, the control member comprising a control element rotatable relative to the tactile surface around a first direction substantially perpendicular to the tactile surface between at least two selection positions,
- the control member comprising at least a first sensor element integral in rotation with the control element, the first sensor element being coupled to the tactile surface in all selection positions of the control element.

Such a control system is, for example, integrated into a vehicle trim element, such as a dashboard lining, a control panel, a center console between the two front or rear seats of the vehicle, a display device or other. The control system allows the user to interact with the display device to display information useful to the driver and/or passengers such as navigation information, pictograms, etc. and/or to control certain vehicle functions.

When the first sensor element is coupled to the tactile surface, i.e. in contact with the tactile surface or at a predetermined distance from the tactile surface so as to be detected by the tactile surface, the position of the first sensor element on the tactile surface is determined. This interaction is similar to that between a user's finger and the tactile surface.

Rotation of the control member allows, for example, the selection of a parameter from a plurality of parameters or the adjustment of the intensity of a parameter (e.g. sound volume in the passenger compartment, temperature in the passenger compartment, etc.).

Description of Related Art

Document US 2017/0052617 A1 describes such a control system. In this type of system, the size of the first sensor element is chosen sufficiently small so that the first sensor element may be detected by the tactile surface. The size of the first sensor element therefore depends on the resolution of the tactile surface. A first sensor element of reduced size allows for precise selection on the tactile surface.

However, the amplitude of the signal generated by a first sensor element of reduced size on the tactile surface is low. This may lead to poor detection of the position of the first sensor element or even confusion with other elements in contact with the tactile surface, for example, the user's fingers on the tactile surface around the control element.

SUMMARY

An objective of the invention is to propose a control system that is simple, compact and which allows a precise detection of the position of the control element on the tactile surface.

For this, the invention relates to a control system of the previously cited type, in which the first sensor element forms an interrupted ring comprising at least one interruption zone, decoupled from the tactile surface on the control element.

Thus, instead of detecting the position of the control element by the coupling between the control element and the tactile surface, the position of the control element is detected due to the position of the interruption zone corresponding to a zone where there exists no coupling with the tactile surface. The signals on the tactile surface generated by the first sensor element and the interruption zone are highly contrasted and thus allow for precise detection of the selection position of the control element.

According to different embodiments, the display device has one or more of the following features, either individually or in any technically possible combination:
- the first sensor element is in the shape of a "C" in the plane substantially parallel to the tactile surface;
- the interruption zone forms an annular sector presenting an angle comprised between 5° and 90° in a plane substantially parallel to the tactile surface;
- the control element comprises a main body fixed onto the surface of the tactile surface and the control element is formed by a ring around the main body, the ring being movable in rotation around the main body, around the first direction, between a plurality of selection positions, the first sensor element being fixed to the ring;
- the main body is formed by a crown defining a through-opening;
- the control element comprises at least a second sensor element, the control element being, in addition, movable in translation relative to the tactile surface according to the first direction between a position selected of the tactile surface in which the second sensor element is decoupled from the tactile surface, and a validation position in which the second sensor element is coupled to the tactile surface;
- the tactile surface is capacitive, and the first sensor element comprises at least a conductive element;
- in the validation position, the second sensor element is arranged in the interruption zone;
- in the validation position, the second sensor element occupies all the interruption zone;
- the second sensor element is formed by a ring, the first sensor element and the second sensor element being concentric, the second sensor element being arranged around or inside the first sensor element in the validation position.

The invention also relates to a vehicle comprising a control system as described above.

BRIEF DESCRIPTION OF THE DRAWINGS

Other features and advantages of the invention will be apparent from the detailed description, which is given below, by way of indication and in no way limiting, with reference to the annexed figures, among which.

DETAILED DESCRIPTION

Figure 1:
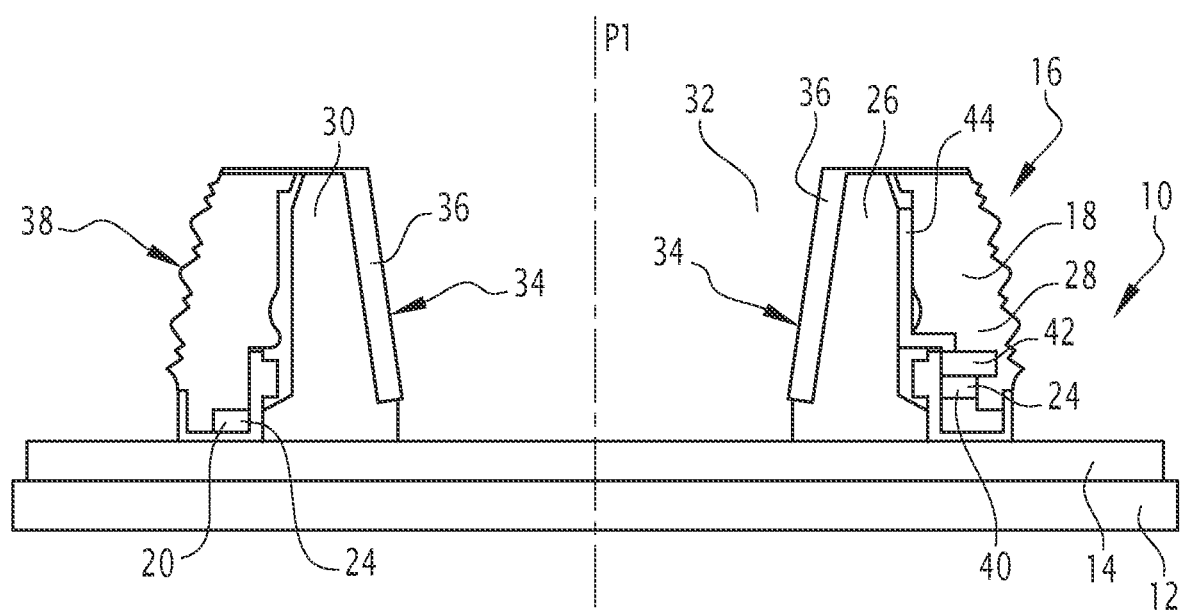
FIG. 1 is a schematic longitudinal section of a control system according to the first embodiment of the invention.

FIG. 1 schematically represents a vehicle control system 10 according to an embodiment of the invention.

The vehicle (not shown) is for example a motor vehicle.

The control system 10 is, for example, integrated into a vehicle trim element, such as a dashboard lining, a control panel, a center console between the two front seats of the vehicle, a display device or similar.

The control system 10 comprises a tactile surface 14, and a control member 16 attached to the tactile surface 14.

According to a particular embodiment, the system includes a support 12 on which the tactile surface 14 extends.

The support 12 is, for example, a display device screen. The display device is then typically intended to display information useful to the driver and/or passengers such as navigation information, pictograms, etc. The control system 10 allows the user to interact with the display device. Alternatively, the holder 12 is a simple plate forming the substrate of a touchpad for example.

Advantageously, the control system 10 includes a control interface and a location unit.

The control interface is configured to control at least one vehicle function.

The interaction between the interface and a user is done by means of the tactile surface 14.

The location unit is configured to determine the position of the control member 16 on the tactile surface 14.

The control interface is arranged according to the position of the control member 16 that has been determined, i.e., depending on the position of the control member 16 on the tactile surface 14, the display of the interface on the tactile surface changes or the control options and parameters of the interface offered to the user change.

Control unit 16 has at least one control element 18.

The control element 18 is rotatable relative to the tactile surface 14 around a first direction P1 substantially perpendicular to the tactile surface 14 between at least two selection positions.

For example, the control element 18 allows selection of one of a plurality of parameters. To do this, the user turns the control element 18 to the left or right. For example, moving the control 18 to the right or left will cause a selection cursor to move up or down, to the right or left, respectively, from a drop-down list displayed on the display device.

Alternatively, the control element 18 can be used to control the intensity of a parameter, such as the volume level in the passenger compartment or the temperature in the passenger compartment. For example, rotating the control element 18 to the right increases the intensity of the parameter, while rotating the control element 18 to the left decreases the intensity of the parameter.

Each of the movements in rotation of the control element 18 corresponds to a distinct selection position.

Advantageously, the control element 18 can be moved in translation relative to the tactile surface 14 in the first direction P1 between a selected position of the tactile surface 14 and a validation position in all the selection positions.

A "selected position" is defined as a position which is separate from the validation position and is a selected position of the tactile surface 14 in this embodiment. Thus, the change from the selected position of the tactile surface 14 to the validation position is effected by pressing the control member 16, and in particular the control element 18, in the first direction P1. The distance between the control element 18 and the tactile surface 14 in the selected position of the tactile surface 14 is, for example, greater than the distance between the control element 18 and the tactile surface 14 in the validation position.

The control element 18 comprises at least one first sensor element 20 fixed to the control element 18 and integral in rotation with the control element 18. Thus, the rotational movement of the control element 18 in the various selection positions causes the first sensor element 20 to rotate in the same way.

Figure 2:
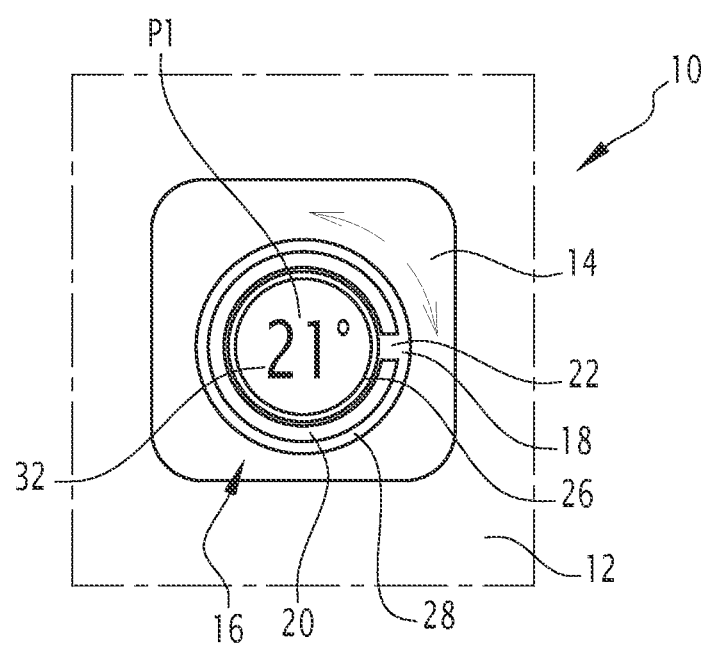
FIG. 2 is a transversal cross-section passing through the first sensor element of the system of FIG. 1 in a position selected by the control element on the tactile surface.
Figure 3:
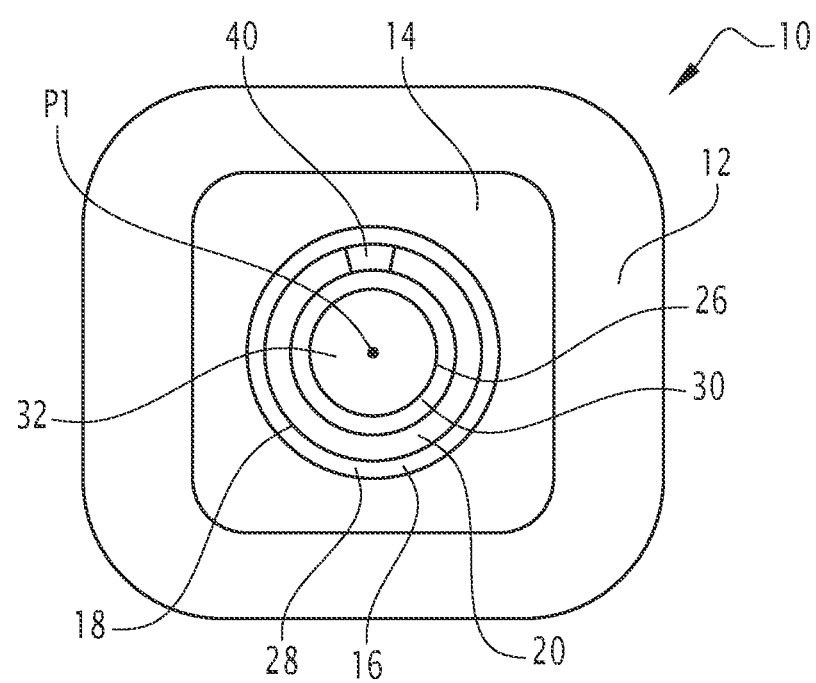
FIG. 3 is a transversal cross-section passing through the first sensor element of the system of FIG. 1 in a validation position of the control element.

As can be seen in FIGS. 2 and 3, the first sensor element 20 forms an interrupted ring defining an interruption zone 22 (FIG. 2). In other words, the first sensor element 20 presents the shape of part of a circle, the arc of the circle completing the circle forming the interruption zone 22.

The first sensor element 20 is coupled to the tactile surface 14 in all the selection positions of the control element 16. "Coupled to tactile surface 14" means that the first sensor element 20 is in contact with tactile surface 14 or at a predetermined distance from the tactile surface 14 so that it is detected by the tactile surface 14. The predetermined distance varies depending on the technology of the tactile surface 14 and is, for example, between 0.3 mm and 1.5 mm.

Conversely, the interruption zone 22 is decoupled from the tactile surface 14, i.e. it forms a zone in which there exists no connection with the tactile surface 14, in all the selection positions of the control element 18.

Thus, in any selection position of the control member 16, the position of the interruption zone 22 on the tactile surface 14 is determined by the absence of coupling with the tactile surface 14. Starting from the interruption zone 22, the angular position of the sensor element 20 is also known.

The first sensor element 20 comprises a first lower coupling surface oriented towards the tactile surface 14. The first lower coupling surface is coupled to the tactile surface 14 in all selection positions of the control member 16.

The first lower coupling surface presents an interrupted ring shape.

Preferably, the first sensor element 20 has the shape of a "C" in a plane substantially parallel to the tactile surface 14. Thus, the interruption zone 22 forms an annular sector.

The annular sector presents an angle comprised between 5° and 90°, preferably between 5° and 30°, for example 10° in a plane substantially parallel to the tactile surface 14.

The angle chosen depends on the resolution of the tactile surface so that the interruption zone can be detected on the tactile surface. It is also chosen as a function of the number of selection positions.

Preferably, the tactile surface 14 is a capacitive tactile surface, and the first sensor element 20 comprises at least one conductive body 24.

Thus, the tactile surface 14 includes, for example, an indium-based layer (not shown) that allows electrical charges present in the layer to move through it. When the conductive body 24 of the first sensor element 20 is coupled to the tactile surface 14, some electrical charges are transferred to the conductive body 24 creating a quantifiable charge deficit in the layer. With a sensor on each corner of the tactile surface 14, it is possible at any moment, to measure and determine the zone on the tactile surface 14, which does not present a charge deficit, i.e, the interruption zone 22, and therefore the position of the control element 18 on the tactile surface.

Alternatively, the tactile surface 14 is a tactile surface with surface waves, a resistive tactile surface, an induction tactile surface, an infrared tactile surface, etc. The first sensor element 20 then includes a body suitable to be detected by the tactile surface 14.

In the example in FIGS. 1 and 2, the control member 16 also has a main body 26 attached to the tactile surface 14. The main body 26 is attached to the tactile surface 14 and remains stationary in all selection positions.

In the example in FIGS. 1 to 4, in which the support 12 is covered with a capacitive tactile surface 14, the main body 26 and the control element 18 are made of a non-conductive material such as plastic in order to avoid interaction with the tactile surface 14.

The control element 18 is formed by a ring 28 arranged around the main body 26.

The ring 28 is thus rotatable around the main body 26 around the first direction P1 between the plurality of selection positions.

Preferably, the main body 26 is formed by a crown 30 defining a through opening 32. Thus, the through-opening 32 reveals the tactile surface 14. This makes it possible to display information on the tactile surface 14 at the through-opening 32. For example, as shown in FIG. 2, the through-opening 32 allows the value of a parameter such as the temperature of the passenger compartment to be displayed.

For example, the interior surface 34 of the through-opening 32 is covered with a decorative layer 36 to give the control unit 16 an aesthetic and decorative appearance. For example, the decorative layer 36 is a metallic layer.

Advantageously, the ring 28 forms a notched wheel defining a plurality of stable selection positions. Together with the main body 26, ring 28 forms a haptic device. When the user turns ring 28, a predetermined rotational force is required to change from one stable selection position to another stable selection position. This enables the user to know precisely the angular distance travelled by ring 28 and to feel the transition between the different selection positions.

In addition, the rotational movement of ring 28 causes, for example, a clicking sound audible to the user when moving from one stable selection position to another.

Preferably, the outer surface 38 of the ring is uneven, for example striated, to improve the user's grip on the ring 28.

Advantageously, the ring 28 is made from an insulating material, or the outer surface 38 of the ring 28 is covered with an insulating material.

The insulating material presents a relative electric permittivity comprised, for example, between 2 and 8.

The material is, for example, of wood or plastic.

This avoids having the first sensor element 20 being electrically charged by contact with the outer surface 38 with the user's fingers.

The control element 18, and more particularly the ring 28 is, in addition, in translation relative to the tactile surface 14 according to the first direction P1 between a selected position of the tactile surface 14 and a validation position in all the selection positions. As such, the passage from the rest position to the validation position is by pressing on the control member 16, and more particularly on the control element 18, according to the first direction P1. The distance separating the control element 18 from the tactile surface 14 in the selected position, is for example, greater than the distance separating the control element 18 from the tactile surface 14 in the validation position.

Advantageously, the control element 18 comprises at least a second sensor element 40 integral in translation and in rotation with the control element 18.

In the selected position, the second sensor element 40 is decoupled from the tactile surface 14. In the validation position, the second sensor element 40 is coupled to the tactile surface 14.

By "decoupled from the tactile surface 14", it is understood that the second sensor element 40 is arranged away from the tactile surface 14 so that it is not able to be detected by the tactile surface 14.

As specified above, for the first sensor element 20, by "coupled to the tactile surface 14", it is understood that the second sensor element 40 is in contact with the tactile surface 14, or at a predetermined distance from the tactile surface so that it is able to be detected by the tactile surface 14.

The second sensor element 40, comprises a second lower coupling surface oriented towards the tactile surface 14. The second lower coupling surface is coupled to the tactile surface 14 in all selection positions of the control member 16.

In the selected position, the second lower coupling surface is decoupled from the tactile surface 14. In the validation position, the second lower coupling surface is coupled to the tactile surface 14.

In the example shown in FIGS. 1 to 4, in which the tactile surface 14 is a capacitive surface, the second sensor element 40 comprises at least one conductive body 24.

The control system 10 also includes a displacement device 42 for displacing the second sensor element 40 in the first direction P1 in relation to the tactile surface 14.

When the control member 16 is moved from the selected position to the validation position, the displacement device 42 of the second sensor element 40 moves the second sensor element 40 translationally relative to the tactile surface 14 in a direction substantially parallel to the first direction P1. The second sensor element 40 is then coupled to the tactile surface 14 in the validation position. It is decoupled from the tactile surface 14 in the selected position.

Advantageously, the control system 10 also comprises a return device 44 of the control member 16 from the validation position to the selected position. The return device 44 of control member 16 cooperates with the displacement device 42 of the second sensor element 40 so that when the return device 44 moves the control member 16, and in particular the control element 18, from the validation position to the selected position, the displacement device 42 of the second sensor element 40 moves the second sensor element 40 from the position coupled to the tactile surface 14 to a position decoupled from the tactile surface 14.

For preference, in the validation position, the second sensor element 40 is arranged in the interruption zone 22.

As is seen in FIG. 3, in the validation position, the second sensor element 40 occupies, for example, all the interruption zone 22.

Thus, at least one lower surface of the second sensor element 40 oriented towards the tactile surface 14, presents a shape complementary to the shape of the interruption zone 22.

The second sensor element 40 presents for example, the shape of an annular sector (FIG. 3) presenting a shape complimentary to the shape of the interruption zone 22 such that in the validation position, the first sensor element 20 and the second sensor element 40 together form a complete ring connected to the tactile surface 14.

More particularly, the second lower coupling surface presents a shape complimentary to the first coupling surface forming together a complete ring in the validation position.

The operation of the device 10 will now be described.

For example, the control system 10 is associated with a device for displaying the temperature of the vehicle's passenger compartment and makes it possible to control the setpoint temperature.

The user turns the control element 18, i.e. the ring 28, around the main body 26 to the right or left depending on whether he wishes to increase or decrease the value of the setpoint temperature. For example, by turning control element 18 to the right, he increases the setpoint temperature. In contrast, turning the control element 18 to the left, he decreases the setpoint temperature. Turning the control element 18 causes sensor elements 20, 40 to rotate.

Since the first sensor element 20 is coupled to the tactile surface 14 in all selection positions of the control member 16, the position of the interruption area 22 on the tactile surface 14 is known for all selection positions. The information about the change in position of the interruption area 22 is then converted into a command, in this case an increase or decrease in the setpoint temperature desired by the user.

The user confirms his choice by pressing the control element 18, which moves in translation towards the tactile surface 14 in the first direction P1. The control member 16 then moves from the selected position to the validation position: the second sensor element 40 moves from the position decoupled from the tactile surface 14 to the position coupled to the tactile surface 14 by means of displacement device 42 of the second sensor element 40 by moving in the area of interruption 22. The information about this change in position of the second sensor element 40 is then converted into a command, i.e. an acknowledgement of the selection made by rotating the control element 18.

The user releases the control element 18, which returns to a selection position (and the selected position) by means of the return device 44 of control element 18. When the operating element 18 is released, the second sensor element 40 moves from the position coupled to the tactile surface 14 to the position decoupled from the tactile surface 14 by means of the displacement device 42.

Such a sequence of operations is, for example, coupled with a display on the screen forming the support 12. Thus, when the user turns the control element 18, the display is changed from the display of the temperature in the passenger compartment to the display of the temperature corresponding to the new temperature desired by the user. In this way, the user knows that if he confirms his choice by pressing the control element, the setpoint temperature will be the one shown on the display.

Figure 4:
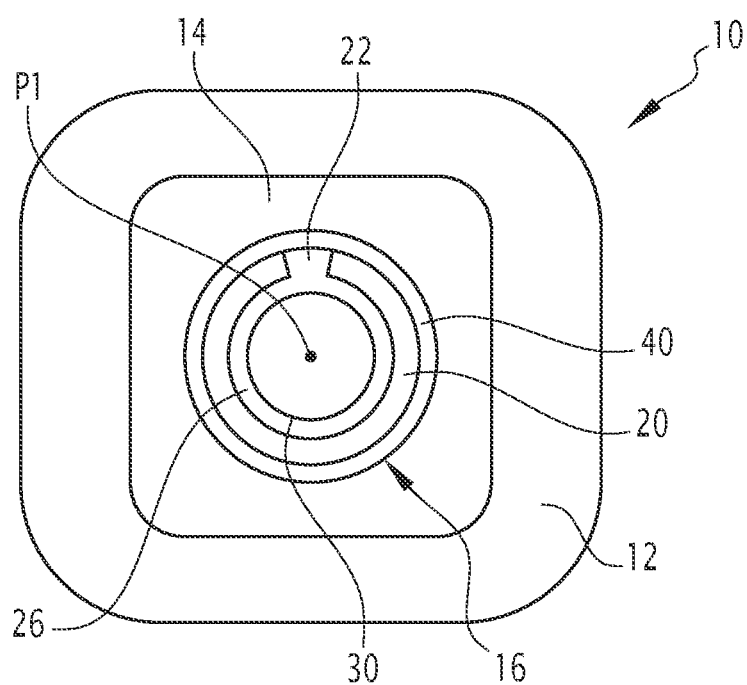
FIG. 4 is a transversal cross-section passing through the first sensor element of the system according to a second embodiment in the validation position.

FIG. 4 shows a second embodiment of the invention. This embodiment will be described by differences from the first embodiment described above.

In this embodiment, the second sensor element 40 is formed by a ring. The first sensor element 20 and the second sensor element 40 are concentric. The second sensor element 40 is arranged around the first sensor element 20 in the validation position.

In another variant, the second sensor element 40 is arranged inside the first sensor element 20 in the validation position.

The operation of the device is identical to that described above.

The invention claimed is:

1. A control system for a vehicle, the system comprising:
    a tactile surface,
    at least one control member fixed to the tactile surface, the control member comprising a control element rotatable relative to the tactile surface around a first axis perpendicular to the tactile surface between at least two selection positions,
    the control member comprising at least a first sensor element integral in rotation with the control element, the first sensor element being coupled to the tactile surface in all selection positions of the control element,
    wherein the first sensor element comprises a first lower coupling surface oriented towards the tactile surface, the first lower coupling surface being coupled to the tactile surface in all selection positions of the control element, the first lower coupling surface forming an interrupted ring defining a single interruption zone decoupled from the tactile surface on the control element.

2. The control system according to claim 1, in which the first sensor element is in the shape of a "C" in a plane parallel to the tactile surface.

3. The control system according to claim 1, in which the interruption zone forms an annular sector presenting an angle comprised between 5° and 90° in a plane parallel to the tactile surface.

4. The control system according to claim 1, in which the control member comprises a main body fixed onto the tactile surface and the control element is formed by a ring arranged around the main body, the ring being movable in rotation around the main body around the first axis between the at least two selection positions, the first sensor element being fixed to the ring.

5. The control system according to claim 4, in which the main body is formed by a crown defining a through-opening revealing the tactile surface.

6. The control system according to claim 1, in which the control member comprises at least a second sensor element, the control element being, in addition, movable in translation relative to the tactile surface in the direction of the first axis between a selected position of the tactile surface in which the second sensor element is decoupled from the tactile surface, and a validation position in which the second sensor element is coupled to the tactile surface.

7. The control system according to claim 1, in which the tactile surface is capacitive, and the first sensor element comprises at least a conductive body.

8. The control system according to claim 6, in which, in the validation position, the second sensor element is arranged in the interruption zone.

9. The control system according to claim 8, in which, in the validation position, the second sensor element occupies all the interruption zone.

10. A vehicle comprising a control system according to claim 1.

11. A control system for a vehicle, the system comprising:
    a tactile surface,
    at least one control member fixed to the tactile surface, the control member comprising a control element rotatable relative to the tactile surface around a first axis perpendicular to the tactile surface between at least two selection positions,
    the control member further comprising at least a first sensor element integral in rotation with the control element, the first sensor element being coupled to the tactile surface in all selection positions of the control element, wherein the first sensor element forms an interrupted ring defining at least an interruption zone decoupled from the tactile surface on the control element, the control member further comprising a main body fixed onto the tactile surface, the control element being formed by a ring arranged around the main body, the ring being movable in rotation around the main body around the first axis between the at least two selection positions, and the first sensor element being fixed to the ring, wherein the main body is formed by a crown defining a through-opening revealing the tactile surface.

12. The control system according to claim 11, wherein an interior surface of the through-opening is covered with a decorative layer made of metal.

* * * * *